(12) United States Patent
Wilhelm et al.

(10) Patent No.: US 7,228,785 B2
(45) Date of Patent: Jun. 12, 2007

(54) PISTON ROD FOR A VIBRATION DAMPER WITH AMPLITUDE-DEPENDENT DAMPING FORCE

(75) Inventors: Ralf Wilhelm, Oberreichenbach (DE); Wolfgang Breun, Niederwerrn (DE); Klaus Sauer, Röthlein (DE); Ludwig Eberlein, Sulzthal (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 11/206,986

(22) Filed: Aug. 18, 2005

(65) Prior Publication Data

US 2006/0060079 A1    Mar. 23, 2006

(30) Foreign Application Priority Data

Aug. 18, 2004  (DE) .................. 10 2004 039 919

(51) Int. Cl.
*F01B 31/00*  (2006.01)
(52) U.S. Cl. ........................................ 92/109
(58) Field of Classification Search ............... 92/109, 92/113, 114
See application file for complete search history.

(56) References Cited

U.S. PATENT DOCUMENTS

| | | |
|---|---|---|
| 2,865,396 A | 12/1958 | Focht |
| 6,561,326 B2 | 5/2003 | Götz |
| 6,572,089 B2 | 6/2003 | Zietsch |
| 2002/0108826 A1* | 8/2002 | Miller et al. ............... 188/280 |
| 2005/0011712 A1 | 1/2005 | Gotz et al. |
| 2005/0109571 A1 | 5/2005 | Burkert et al. |

FOREIGN PATENT DOCUMENTS

| | | |
|---|---|---|
| DE | 35 34 298 | 4/1987 |
| DE | 100 51 769 | 11/2001 |
| EP | 0 034 220 | 8/1981 |
| EP | 1 152 166 | 11/2001 |
| EP | 1 496 285 | 1/2005 |
| EP | 1 533 541 | 5/2005 |
| JP | 2002 039248 | 2/2002 |

OTHER PUBLICATIONS

Search Report corresponding to the European application dated Oct. 6, 2005.

* cited by examiner

*Primary Examiner*—Michael Leslie
(74) *Attorney, Agent, or Firm*—Cohen Pontani Lieberman & Pavane LLP

(57) ABSTRACT

A piston rod has a hollow section with an open end, a housing, and a fastening connection for a piston. The housing includes a cap welded to the open end, a tubular intermediate piece welded to the cap, and a bottom part attached to the fastening connection. The cap has a shoulder received in the intermediate piece to form an annular space which functions as a labyrinth seal to receive any weld spatters formed during the friction welding process. The outside surface of the piston rod is machined to final dimensions and surface coated following welding.

8 Claims, 2 Drawing Sheets

PISTON ROD FOR A VIBRATION DAMPER WITH AMPLITUDE-DEPENDENT DAMPING FORCE

BACKGROUND OF THE INVENTION

1. Field of the Invention

The invention pertains to a piston rod for a vibration damper.

2. Description of the Related Art

U.S. Pat. No. 6,561,326 describes a vibration damper with amplitude-dependent damping force, to the piston rod of which a damping medium-filled chamber is attached, in which a separating piston is installed with freedom to slide back and forth. In FIG. 3 of U.S. Pat. No. 6,561,326, the chamber is formed by a housing, which is connected to the piston rod in the area above a piston. The specification provides no information on the technique used to establish this connection. FIG. 4 discloses a screwed joint between the housing and the piston rod.

A problem is that the screwed joint between the housing and the piston rod should be prevented from getting loosened. A screwed joint is also comparatively expensive.

An object of the present invention is to connect a housing to a piston rod in such a way that the disadvantages of the state of the art are eliminated.

SUMMARY OF THE INVENTION

This task is accomplished according to the invention in that a section of the piston rod is hollow over at least a portion of its length, and in that the cap of the housing is welded to this section of the piston rod.

Because the piston rod is hollow over a portion of its length, it is low in weight. Even though the piston rod is hollow, there is no need to provide any additional reinforcing measures to seal it, because the welded cap performs this function.

In a further advantageous embodiment of the invention, the cap and a tubular intermediate piece of the housing form a labyrinth seal, which protects the chamber of the housing. The idea is to prevent weld spatters from arriving in the interior of the housing, where, as contaminants, they could cause damage in or on the components attached to the piston rod.

The cap has a stepped external contour and has a shoulder which fits into the housing. An annular gap, which holds any weld spatters which may form, is located between an inside wall of the housing and the shoulder.

According to a further embodiment of the present invention welding material is located between a lateral surface of the shoulder and an inside wall of the intermediate piece. The weld between the housing and the cap can extend over the entire thickness of the housing wall without the fear that differences in the quality of the weld will occur over its width.

Comparatively short welding times can be achieved by joining the cap to the intermediate piece by means of a friction weld.

The friction welding is carried out under application of axial pretension between the cap and the housing. A connecting surface at the end of the cap has a freeing cut, which separates the connecting surface from the lateral surface. The depth of the freeing cut determines the maximum distance by which the cap and the housing can be advanced toward each other. In the absence of this freeing cut, one would in practice be welding a flat disk to a tube, in which case the axial displacement during friction welding would have to be absorbed exclusively by the tubular body.

In a further embodiment, the distance between the lateral surface of the cap and the inside wall of the intermediate piece is greater in the area of the freeing cut than at the sealing edge of the cap. This makes available a large annular space to accommodate weld material, and at the same time it effectively seals off the interior of the housing, the term "sealing edge" not necessarily being understood as a hermetic joint line. Thus the shoulder on the cap can have a dovetail-shaped lateral surface.

In an alternative design, the intermediate piece of the housing has a stepped internal contour in the area of the axial overlap with the cap. The cap then has a simple T-shaped outline and can thus be easily produced, even by forging.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
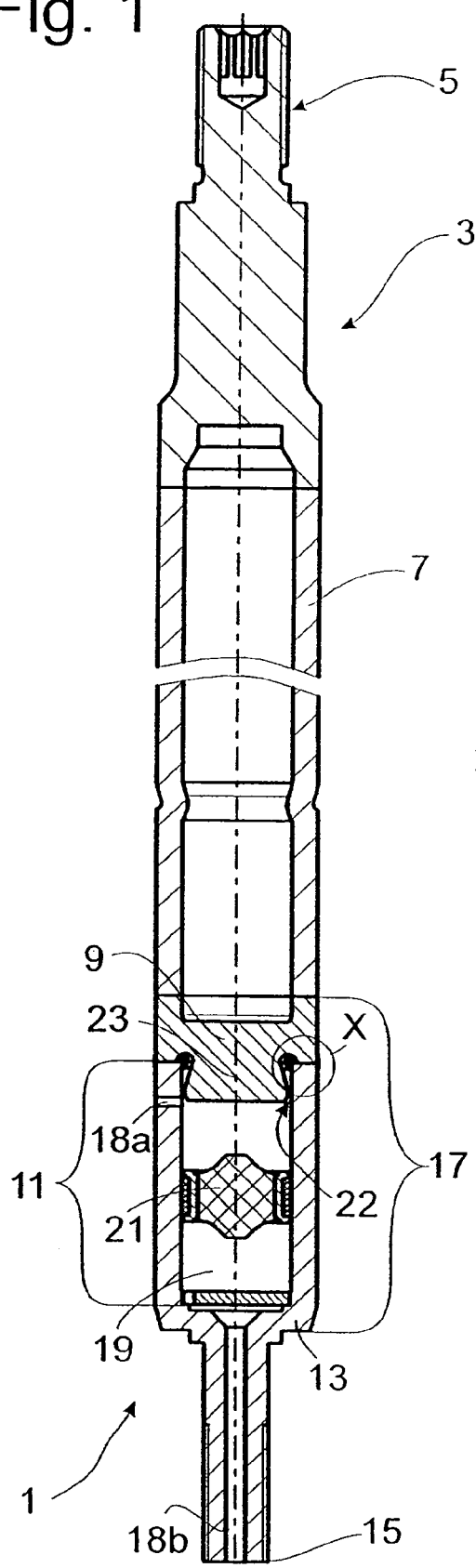
FIG. 1 shows a cross section through a piston rod with a cap, which has a dovetail-shaped shoulder.

FIG. 1 shows a piston rod 1, like that which can be used in a vibration damper with amplitude-dependent damping force. The piston rod 1 is divided into several sections. At one end, the piston rod has a piston rod head 3 with surfaces 5 with a connecting function, e.g., for a pin joint (not shown). Adjacent to the piston rod head is a section 7, which is hollow over at least a portion of its length. The open end of the piston rod section 7 is sealed by a cap 9. The three described components 3, 7, 9 of the piston rod 1 are produced as separate parts with a certain oversize and are then welded together. Then the piston rod is machined to final dimensions, and its surface is coated, e.g., chrome-plated. A friction-welding method is used for the welding. The cap 9 is welded on even before the final machining and the chrome-plating, so that no manufacturing contaminants such as lubricating or cleaning fluids can accumulate inside the hollow section of the piston rod during production.

A tubular intermediate piece 11 with a bottom part 13 and a fastening connection 15 for a piston (not shown) follows after the cap 9. The cap 9, the intermediate piece 11, and the bottom part 13 form a housing 17, in the chamber 19 of which a separating piston 21 is installed with the freedom to slide back and forth axially between the bottom part and the cap. The chamber has two connecting openings 18a, 18b, through which an exchange of damping medium can occur.

Figure 2:
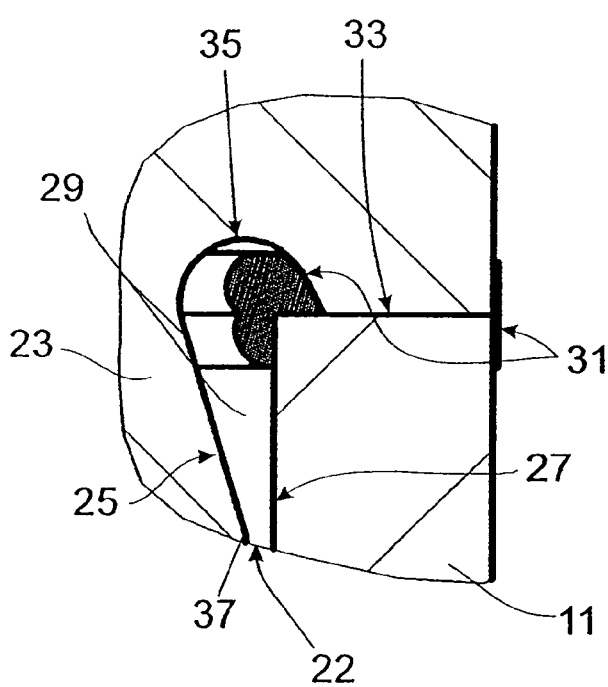
FIG. 2 shows a detail of FIG. 1.

The tubular intermediate piece 11 is also welded to the cap 9. The cap and the intermediate piece cooperate to form a labyrinth seal 22. The cap 9 has a stepped external contour defining a shoulder 23, which fits into the intermediate piece 11. FIG. 2 shows a detailed view of the labyrinth seal 22. Between a lateral surface 25 of the shoulder 23 and an inside wall 27 of the intermediate piece 11 there is an annular space 29 to accept weld material 31. The cap is connected to the intermediate piece 11 by means of a friction weld, so that, as a result of the axial ramming movement between the two parts during the welding process, a certain amount of material is displaced radially inward and a certain amount is deposited on the outside of the weld. A connecting surface 33 on the end of the cap 9 has a freeing cut 35, which separates the connecting surface 33 from the lateral surface 25. The groove-like freeing cut also accepts weld material.

The distance between the lateral surface 25 of the cap 9 and the inside wall 27 of the intermediate piece is greater in the area of the freeing cut 35 than at the sealing edge 37 of the cap. In this exemplary embodiment, the cap has a dovetail-shaped lateral surface 25, so that any weld spatters which form will be deposited on the lateral surface 25 and will be too big to pass through the labyrinth seal to the other side of the sealing edge 37.

Figure 3:
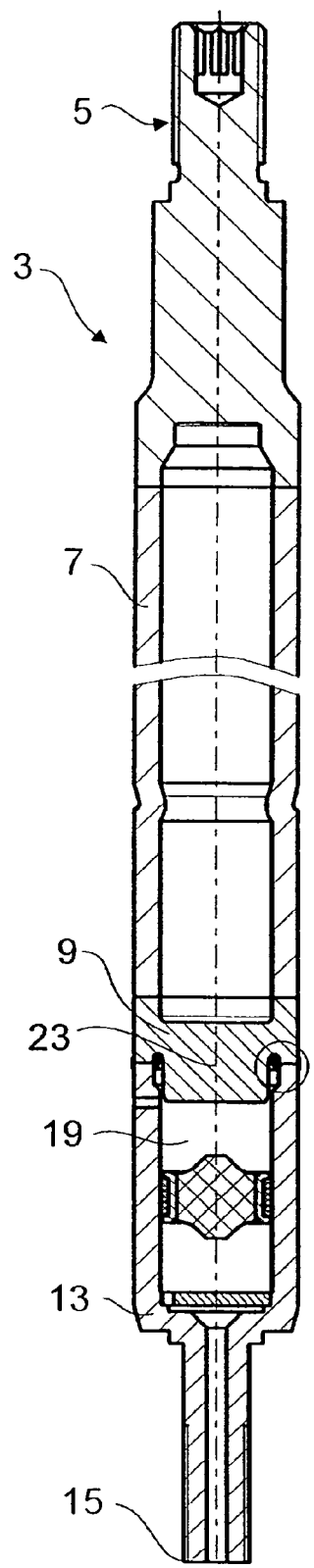
FIG. 3 shows a cross section through a piston rod with an intermediate piece with a stepped inside contour.
Figure 4:
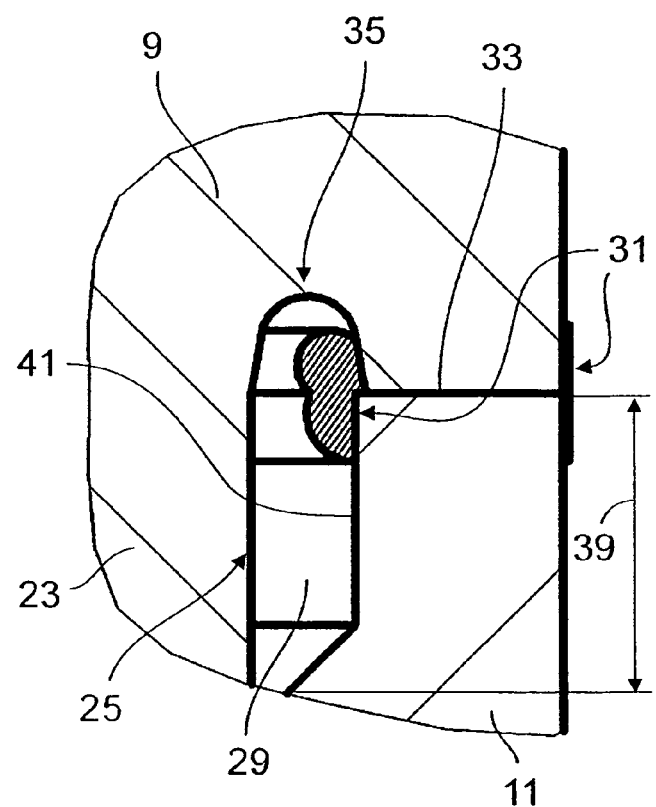
FIG. 4 shows a detail of FIG. 3.

FIG. 3 shows a piston rod similar in its basic design to that of FIG. 1. The difference, as FIG. 4 shows, is that the contour of the labyrinth seal 35 is changed. The cap 9 has a simple, cylindrical shoulder 23. The intermediate piece 11 of the housing 17 has a stepped internal contour 41 in the area of the axial overlap 39. Between the lateral surface 25 and the internal contour 41, an annular space 29 is available, which tapers down in the direction toward the chamber 19, so that any weld spatters which form will be deposited on the internal contour 41, which means that the function of the labyrinth seal is fulfilled.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A piston rod extending along an axis, comprising:
a hollow piston rod section having an open end;
an axially extending connection unit for coupling the piston rod to a piston, the connection unit being axially spaced from the hollow piston rod section; and
a housing axially extending between the connection unit and the hollow piston rod section, the housing having a cap welded to the open end of the hollow piston rod section, the housing further having a tubular intermediate piece welded to the cap and extending from the cap toward the connection unit and defining an inner chamber, the intermediate piece and the cap being configured to form a labyrinth seal which prevents welding material from entering the inner chamber during welding of the cap to the intermediate piece.

2. The piston rod of claim 1, wherein the cap has a stepped external contour defining a shoulder, the shoulder being configured to fit into the tubular intermediate piece.

3. The piston rod of claim 2, wherein the shoulder has an axially extending lateral surface facing an inner surface of the tubular intermediate piece of the housing, wherein the lateral surface of the shoulder and the inner surface of the tubular intermediate piece define therebetween an annular space configured to hold welding material.

4. The piston rod of claim 3, wherein the shoulder of the cap has a radially extending connecting surface axially juxtaposed with the tubular intermediate piece of the housing, the cap being provided with a freeing cut separating the connecting surface from the lateral surface of the shoulder.

5. The piston rod of claim 4, wherein the lateral surface of the shoulder of the cap has a sealing edge spaced axially from the freeing cut and extending towards the inner surface of the tubular intermediate piece, the lateral surface of the shoulder and the inner surface of the tubular intermediate piece being spaced further apart as the freeing cut than at the sealing edge.

6. The piston of claim 5, wherein the shoulder has a dovetail-shaped cross-section.

7. The piston of claim 5, wherein the inner surface of the tubular intermediate piece of the housing opposing the lateral surface of the shoulder has a stepped contour provided with an axial region angled towards the lateral surface.

8. The piston of claim 1, wherein the cap and the intermediate piece are welded together by a friction weld.

* * * * *